(12) United States Patent
Parkin

(10) Patent No.: US 11,394,244 B2
(45) Date of Patent: Jul. 19, 2022

(54) MOBILE DEVICE CHARGER

(71) Applicant: Norman Frederick Parkin, Centurion (ZA)

(72) Inventor: Norman Frederick Parkin, Centurion (ZA)

( * ) Notice: Subject to any disclaimer, the term of this patent is extended or adjusted under 35 U.S.C. 154(b) by 0 days.

(21) Appl. No.: 17/351,125

(22) Filed: Jun. 17, 2021

(65) Prior Publication Data

US 2021/0399585 A1 Dec. 23, 2021

(30) Foreign Application Priority Data

Jun. 19, 2020 (ZA) .................. 2020/03690

(51) Int. Cl.
  *H02J 50/12* (2016.01)
  *H02J 7/00* (2006.01)
  *H02J 50/80* (2016.01)

(52) U.S. Cl.
  CPC ............ *H02J 50/12* (2016.02); *H02J 7/0044* (2013.01); *H02J 50/80* (2016.02)

(58) Field of Classification Search
  CPC .......... H02J 50/12; H02J 7/0044; H02J 50/80; H02J 2310/22; H02J 50/10; H02J 50/90
  See application file for complete search history.

(56) References Cited

U.S. PATENT DOCUMENTS

| 7,026,789 B2 * | 4/2006 | Bozzone | ............... | H02J 7/0044 320/108 |
| 2010/0164431 A1 * | 7/2010 | Sip | ........................ | H02J 7/0042 320/108 |
| 2011/0227527 A1 * | 9/2011 | Zhu | ......................... | H02J 7/025 320/108 |
| 2013/0026983 A1 * | 1/2013 | Yamamoto | ................ | H02J 7/02 320/108 |
| 2013/0093386 A1 * | 4/2013 | Tsai | ....................... | H02J 50/005 320/108 |

(Continued)

FOREIGN PATENT DOCUMENTS

| CN | 105703454 A | * | 6/2016 | | |
| DE | 202015101232 U1 | * | 4/2015 | ............ | H02J 7/0044 |

(Continued)

*Primary Examiner* — Jared Fureman
*Assistant Examiner* — Michael J Warmflash
(74) *Attorney, Agent, or Firm* — McDonnell Boehnen Hulbert & Berghoff LLP

(57) ABSTRACT

A charger for a mobile device has a base with at least a subset of the circuitry of the charger and electrical contacts arranged on a mounting surface of the base to enable connection to terminals of a power transfer component external to the base in order to complete the circuitry of the charger. The power transfer component has electrical contacts arranged on a mounting surface to enable connection thereof to corresponding contacts on the base when the power transfer component is mounted to the base. The power transfer component is configured to be positioned in proximity to a mobile device such that mounting it to the base enables the base to transfer electrical power to the mobile device via the power transfer component. The mounting surfaces of the base and power transfer component include complementary magnetic mounts enabling the power transfer component to be magnetically mounted to the base.

6 Claims, 6 Drawing Sheets

(56) References Cited

U.S. PATENT DOCUMENTS

| | | | | |
|---|---|---|---|---|
| 2018/0059758 A1* | 3/2018 | Boatner | ............ | G06F 1/266 |
| 2018/0207820 A1* | 7/2018 | Schaefer | ............ | H01F 7/0242 |
| 2020/0259346 A1* | 8/2020 | Mizoguchi | ......... | H04M 1/0262 |
| 2020/0315307 A1* | 10/2020 | Foreman | ............ | H02J 50/12 |
| 2020/0328605 A1* | 10/2020 | Weber | ............ | H02J 7/0044 |

FOREIGN PATENT DOCUMENTS

| | | | | |
|---|---|---|---|---|
| JP | 2011155608 A | * | 8/2011 | |
| WO | WO-2007071878 A2 | * | 6/2007 | ............ A45F 5/02 |

* cited by examiner

IV – IV

MOBILE DEVICE CHARGER

CROSS-REFERENCE TO RELATED APPLICATIONS

This application claims priority from South African provisional patent application number 2020/03690 filed on 19 Jun. 2020, which is incorporated by reference herein.

FIELD

This present disclosure relates to chargers for mobile devices. It finds particular application, although by no means exclusively, in chargers for mobile devices utilising electromagnetic induction charging methods.

BACKGROUND

Wireless charging of mobile devices enables a mobile device to be conveniently charged by merely placing the mobile device on a wireless charging base.

Wireless charging relies on the principle of electromagnetic induction and a brief overview of the technology follows. The wireless charging base is provided with a coil (the transmitter coil) and the circuitry of the base causes alternating current to flow through the transmitter coil. A mobile device that is wireless charging enabled is provided with a complementary coil (the receiving coil) that is housed within the housing of the mobile device. When the mobile device is brought in proximity of the base, the magnetic field caused by the alternating current in the transmitter coil induces an electric current in the receiver coil of the mobile device, which is rectified and utilised by the mobile device's charging circuitry to recharge its battery.

Protective covers are widely used with mobile devices in order to protect the device from fall damage, for example. Some mobile device covers are ruggedized with thick walls or may even be made from a metal such as aluminium. The use of magnetic mounts in vehicles has also become widespread, with a piece of ferromagnetic material (e.g. a small steel plate) being affixed to the back of the mobile device to enable the mobile device to mount to the magnetic mount. These ruggedized phone cases or metallic strips may block or interfere with the magnetic field of a wireless charger, which may have a negative effect on the efficiency of the wireless charging, or may even prevent it from working altogether.

The Applicant considers there to be scope for improvement.

The preceding discussion of the background is intended only to facilitate an understanding of the present disclosure. It should be appreciated that the discussion is not an acknowledgment or admission that any of the material referred to was part of the common general knowledge in the art as at the priority date of the application.

SUMMARY

In accordance with the present disclosure there is provided a charger for a mobile device comprising:
  a base that includes at least a subset of the circuitry of the charger and electrical contacts arranged on a mounting surface of the base to enable connection to terminals of a power transfer component external to the base in order to complete the circuitry of the charger; and
  a power transfer component having electrical contacts arranged on a mounting surface of the power transfer component to enable connection thereof to corresponding contacts on the base when the power transfer component is mounted to the base,
  wherein the power transfer component is configured to be positioned in proximity to a mobile device such that mounting the power transfer component to the base enables the base to transfer electrical power to the mobile device via the power transfer component, and
  wherein the mounting surfaces of the base and power transfer component include complementary magnetic mounts enabling the power transfer component to be magnetically mounted to the base.

At least one of the electrical contacts of the base or of the power transfer component may at least partially consist of a permanent magnet to enable magnetic mounting of the relevant contact with a corresponding contact on the other of the base and power transfer component.

These features may enable the electrical contacts themselves to provide the magnetic mounts (or at least in part), as opposed to the electrical contacts and magnetic mounts being separate.

The mounting surface of the base and the power transfer component may each have a centrally positioned electrical contact for providing electrical connection between the base and a first terminal of the power transfer component, and a plurality of surrounding contacts arranged radially about the central contact for providing electrical connection between the base and a second terminal of the power transfer component.

In one embodiment, the mounting surface of the base and the power transfer component each have four surrounding contacts arranged radially about the central contact at substantially equal angular intervals (similarly to the arrangement of the dots on the number 5 side of a die).

The centrally positioned electrical contact on either of the base or the power transfer component may be spring-loaded so as to extend further from the mounting surface than the surrounding contacts when the power transfer component is not mounted to the base, and the surrounding contacts on one or both of the base and the power transfer component may be permanent magnets enabling the surrounding contacts of the base to be magnetically mounted to the surrounding contacts of the power transfer component.

These features may enable the centrally positioned contacts to be pulled toward each other against the biasing force of the spring-loaded contact, due to the magnetic forces of the surrounding contacts when the power transfer component is mounted to the base. This may, in turn, provide better electrical contact between the centrally positioned contacts.

The power transfer component may form part of a protective cover for a mobile device, such that fitting a mobile device with the protective cover positions the power transfer component in proximity to the mobile device.

These features may enable the power transfer component to form part of an assembly for, or to be integrally formed with, a protective cover for a mobile device.

The power transfer component may include a transmitter coil configured to be positioned in proximity to a mobile device such that mounting the power transfer component to the base enables the base to transfer electrical power to the mobile device via the transmitter coil.

These features may enable the charger to comprise an induction wireless charger that separates the transmitter coil from the base. This, in turn, enables the transmitter coil to be placed against (or at least nearer to) the rear of the housing of a mobile device, which may provide more optimal power transfer to the receiver coil internal to the mobile device. The electrical contacts may enable the transmitter coil to be electrically connected to the base, completing the circuit (and circuitry) of the charger.

These features may further enable the transmitter coil of the coil unit to be positioned in the protective cover such that the transmitter coil is positioned close to the internal receiving coil of the mobile device when the protective cover is installed on the mobile device.

The present disclosure extends to a base for a charger as provided above.

The present disclosure further extends to a power transfer component unit for a charger as provided above.

The present disclosure further extends to a protective cover for a mobile device including a power transfer component for a charger as provided above.

Embodiments of the present disclosure will now be described, by way of example only, with reference to the accompanying drawings.

DETAILED DESCRIPTION

Figure 1:
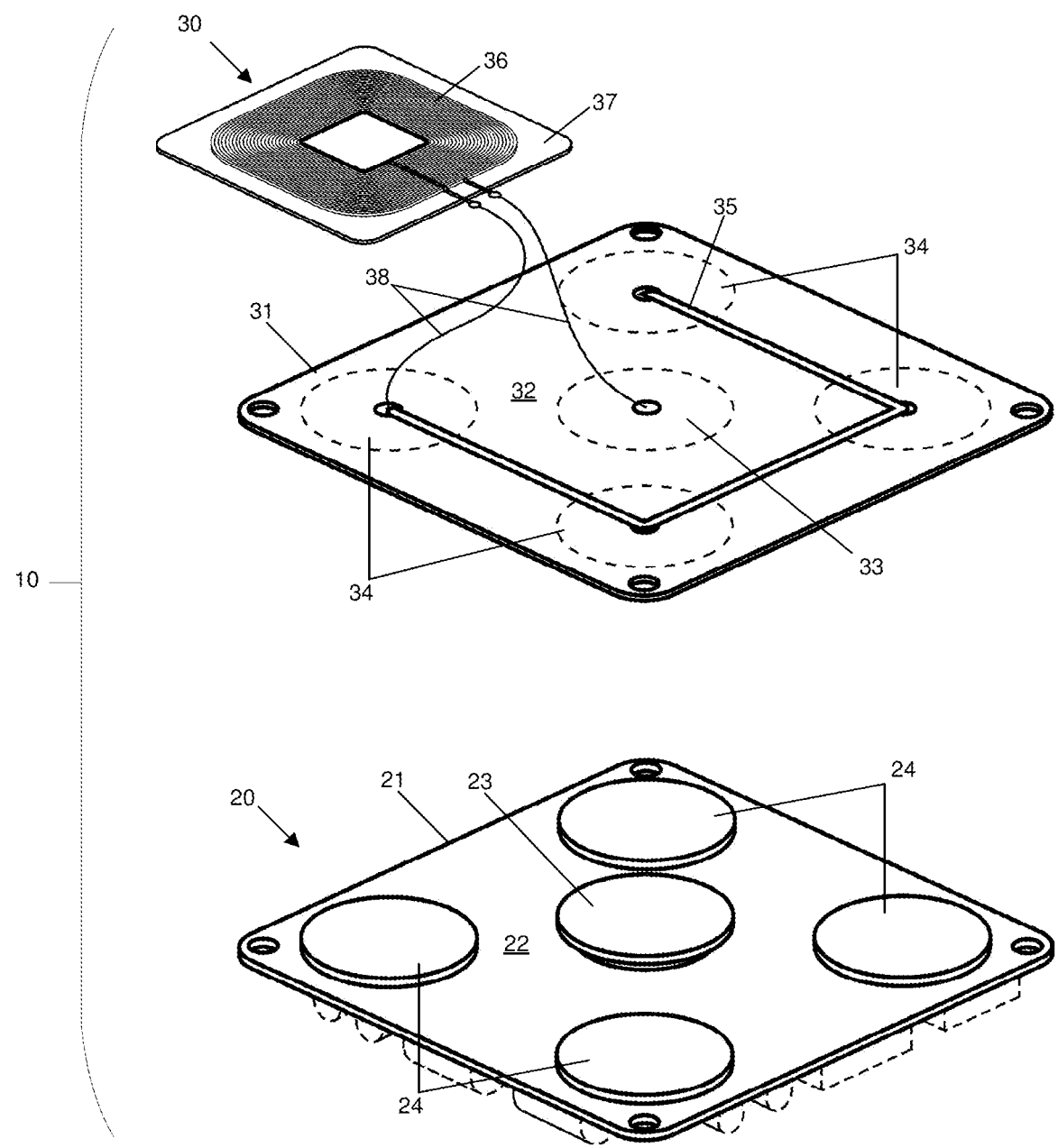
FIG. 1 is an exploded three-dimensional view of a charger in accordance with the present disclosure in which the power transfer component includes a transmitter coil.

A charger for a mobile device is described below. The charger has a base that includes at least a subset of the circuitry of the charger, such as power electronics and a charging controller. While the base may include at least a subset of the circuitry, the remainder or complement of the circuitry may be provided by the power transfer component. The base further includes electrical contacts arranged on a mounting surface of the base. These electrical contacts are provided to enable electrical connection of the electronics and circuitry of the base to an external power transfer component that is positioned in proximity to a mobile device.

The charger further includes a power transfer component, external to the base, having electrical contacts that are arranged on a mounting surface thereof. The electrical contacts of the power transfer component have a complementary arrangement to that of the electrical contacts on the mounting surface of the base. This enables connection of the respective electrical contacts of the base and of the power transfer component when the base and power transfer component are mounted to each other.

In some embodiments, the power transfer component may include a conductor and a connector (e.g. a micro Universal Serial Bus (USB) connector; type C USB connector; Lightning connector; etc.) that is connectable to a charging port of the mobile device. The electrical contacts of the transfer component enable electrical connection of the connector to the base, thereby enabling the base to transfer power to the charging port of the mobile device via the power transfer component. In such embodiments, positioning the power transfer component in proximity to the mobile device therefore includes making electrical connection with the charging port of the mobile device. The power transfer component may form part of a protective cover for the mobile device, such that the connector is connected to the charging port of the mobile device when the protective cover is fit to the mobile device.

In another embodiment, the power transfer component is a coil unit that includes an external transmitter coil (i.e. external to the base) arranged to be placed in proximity to a receiver coil of a mobile device to be charged, generally against the rear of the housing of the mobile device. The mobile device may be any wireless charging enabled mobile device, such as a mobile phone or a tablet computer. Should the mobile device be equipped with a protective cover, the external transmitter coil would therefore ideally be positioned between the protective cover and the housing of the mobile device to ensure optimal power transfer between the transmitter coil, and the receiver coil internal to the mobile device.

The mounting surfaces of the base and power transfer component have complementary magnetic mounts to enable the power transfer component to be magnetically mounted to the base. These magnetic mounts may be provided by the electrical contacts themselves. In such embodiments, at least some of the electrical contacts on either or both of the base and power transfer component may be permanent magnets, with its complementary electrical contact on the other of the base or power transfer component would be a ferromagnetic structure, such as a steel pad, or alternatively an oppositely polarised magnet. Therefore, when the power transfer component is mounted to the base, the electrical contacts that are permanent magnets provide a dual purpose of providing electrical connection, as well as holding the power transfer component mounted to the base by means of magnetic forces.

In some embodiments, the power transfer component may form part of a protective cover for a mobile device. In such embodiments, the electrical contacts of the power transfer component may be appropriately exposed to enable electrical contact with the electrical contacts of the base when mounted. For example, the power transfer component may include a printed circuit board provided in an operatively inner side of the back of the protective cover, with the contacts positioned on the printed circuit board. Appropriate apertures may be provided in the back of the protective cover to allow the electrical contacts of the base and power transfer component to connect when mounted.

Similarly, the base may be provided on a printed circuit board, with the power electronics, charging controllers, and other miscellaneous circuitry being provided on the printed circuit board, as well as the electrical contacts. This printed circuit board may be housed in an appropriate housing, with apertures provided to expose the electrical contacts of the base for electrical connection to that of the power transfer component when mounted.

The housing for the base may be adapted for use in a vehicle, to provide a convenient magnetic mounting for the mobile device in the vehicle, whilst also providing charging when the mobile device (with the power transfer component placed in proximity thereto) is mounted to the base.

FIG. 1 shows a partly exploded view of an embodiment of a charger (10) in accordance with the present disclosure, including a base (20) and a power transfer component. In this particular embodiment, the charger (10) is configured for wireless charging (i.e. inductive charging) and the power transfer component accordingly includes coil unit (30) with a transmitter coil described in further detail below.

The base (20) includes a printed circuit board (PCB) (21) providing circuitry and electronic components of the base that are not immediately visible in FIG. 1, since they are populated on the underside of the base PCB (21). The side of the base PCB (21) visible in FIG. 1 forms a mounting surface (22), as will be explained in further detail below. Five electrical contacts are arranged on the mounting surface (22) including a centrally positioned electrical contact (23) and four surrounding contacts (24) spaced radially about the centrally positioned contact. This spacing may resemble the dots of the number 5 side of a die. These five electrical contacts (23, 24) are soldered to exposed conductor pads (not shown) on the mounting surface (22) of the PCB (21), connecting it to the circuitry and electronics of the base (20). The four surrounding contacts (24) are permanent magnets that are electrically connected by conductors provided on the PCB (21) and therefore (in concert) form one distributed electrical contact, as well as a magnetic mount.

While the base (20) of the charger (10) comprises wireless charging components, electronics, and controllers, it is not equipped with the transmitter coil that is an essential component required for transferring power from a wireless charging base to a receiver coil in a mobile device. In accordance with the present disclosure, the transmitter coil is separated from, or external to, the base. The electrical contacts (23, 24) of the base (20) are therefore intended to facilitate electrical contact with the two terminals of an external transmitter coil to complete the circuitry required for wirelessly charging a mobile device.

The charger (10) further includes a coil unit (30) having a coil unit PCB (31) providing electrical contacts (33, 34) on a mounting surface (32) thereof with a mirror-image layout to the electrical contacts (23, 24) on the PCB (21) of the base (20). The position of the electrical contacts (33, 34) are indicated in broken lines in FIG. 1, since the mounting surface (32) of the coil unit PCB (31) is facing away from the viewer, towards the mounting surface (22) of the base (20). The four surrounding contacts (34) of the coil unit are stainless steel (a ferromagnetic metal) enabling it to magnetically mount to the surrounding contacts (24) of the base (20) (which are permanent magnets, as aforementioned). Similarly as with the base (20), the surrounding contacts (34) of the coil unit (30) are electrically connected to each other by a conductor (or "track") (35) on the coil unit's PCB (31).

The coil unit (30) further includes a transmitter coil (36) with a ferrite core (37). The two terminals (38) of the transmitter coil (36) are soldered to exposed conductor pads on the coil unit PCB (31), which electrically connect the two terminals to the centrally positioned electrical contact (33), and the surrounding electrical contacts (34), respectively.

Figure 2:
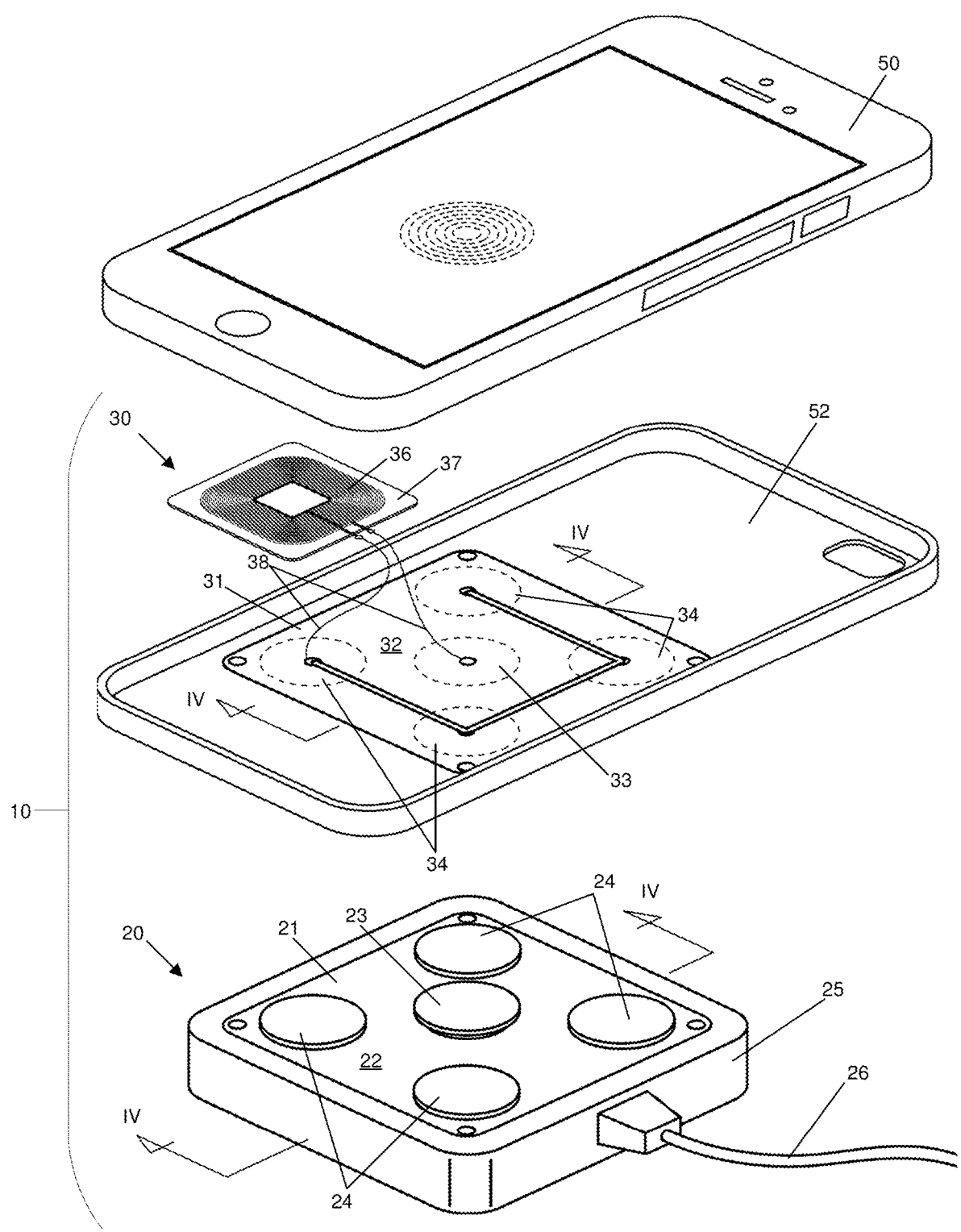
FIG. 2 is an exploded three-dimensional view showing the charger of FIG. 1 in use with a mobile device and protective cover.

FIG. 2 shows a partly exploded view of the base (20) and the coil unit (30) in use with a mobile device (50), and a protective cover (52) for the mobile device. The mobile device (50) is wireless charging enabled and therefore has an internal receiving coil (51). In FIG. 2, the base (20) has been installed in a housing (25), with a power supply cable (26) extending from a side of the housing for connecting the base (20) to a suitable power supply.

Figure 3:
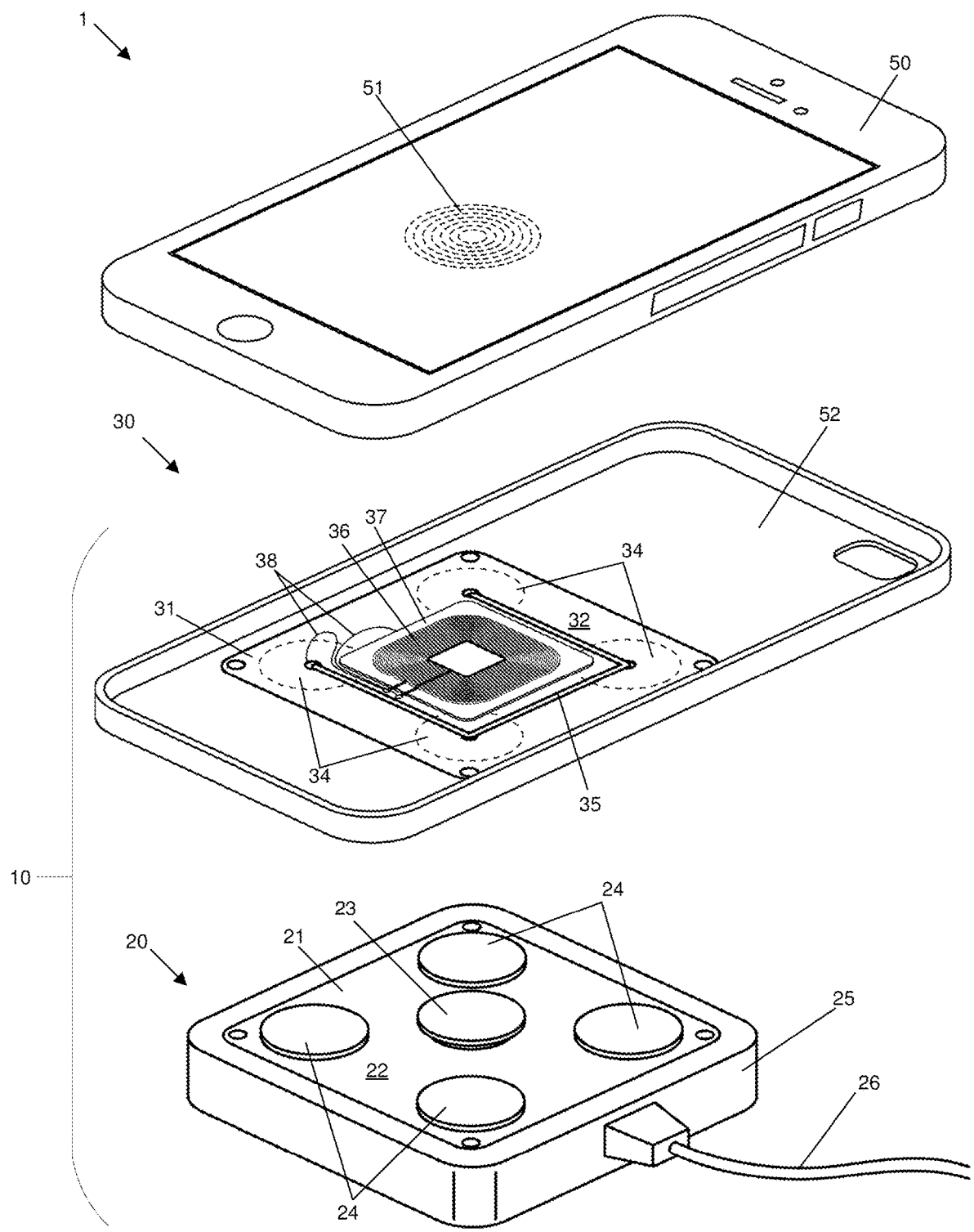
FIG. 3 is an exploded three-dimensional view similar to that of FIG. 2, but with a transmitter coil of the charger's power transfer component positioned in the protective cover.
Figure 4:
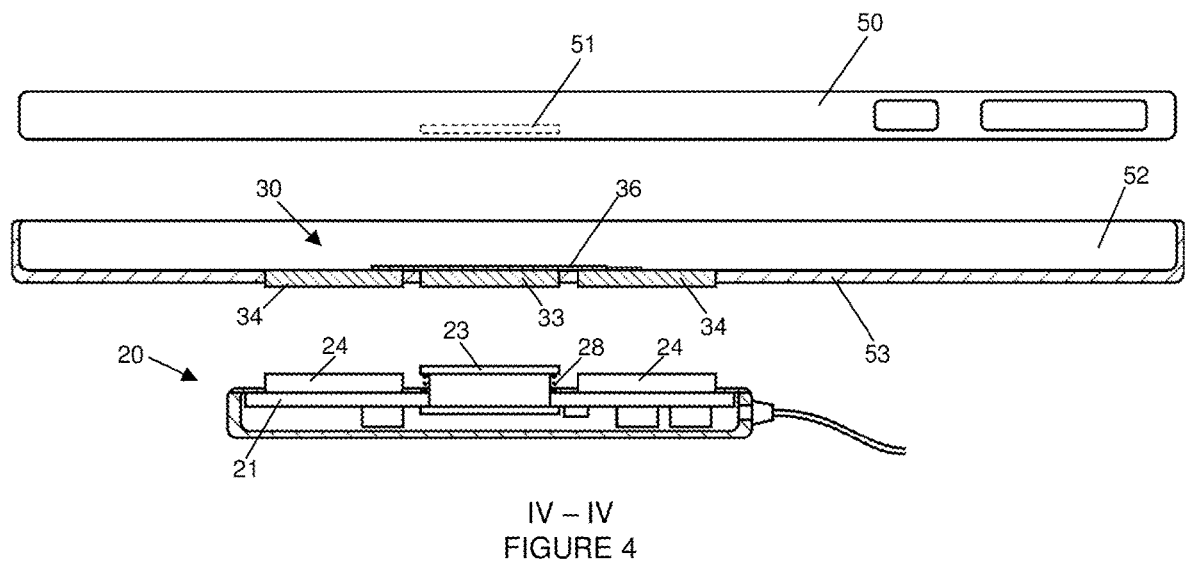
FIG. 4 is a section view along IV-IV shown in FIG. 2.

FIG. 3 shows a partly exploded view similar to that of FIG. 2, but with the transmitter coil (36) and ferrite core (37) placed against the coil unit's PCB (31). A corresponding section view is shown in FIG. 4, which shows that the protective cover (52) has been adapted with apertures to allow the electrical contacts (33, 34) of the coil unit (30) to protrude through the back (53) of the protective cover. This allows these contacts (33, 34) to make electrical contact with the electrical contacts (23, 24) of the base (20) when mounted.

FIG. 4 also shows that in its unmounted condition, the centrally positioned electrical contact (23) of the base (20) extends further from the mounting surface (22) than the surrounding electrical contacts (24). The centrally positioned electrical contact (23) is slidably held in the base PCB (21) to enable movement thereof in a direction perpendicular to the mounting surface (22). A compression spring (28) is provided that, in the unmounted condition as shown in FIG. 4, pushes the centrally positioned electrical contact (23) to extend slightly further from the mounting surface (22) than the surrounding electrical contacts (24).

Figure 5:
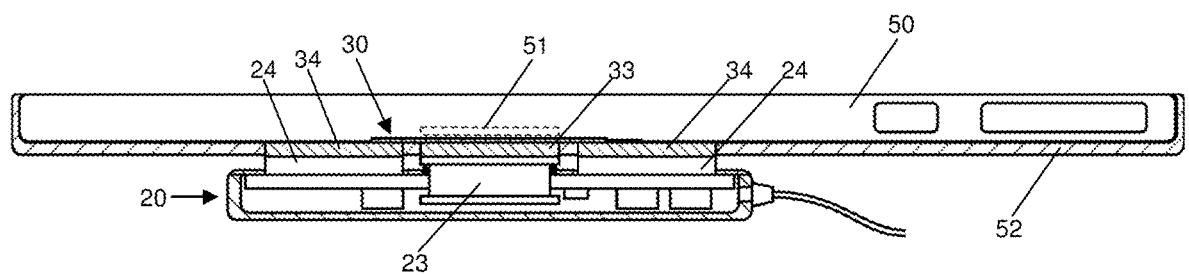
FIG. 5 is a section view similar to that of FIG. 4 with the power transfer component magnetically mounted to a base of the charger.

FIG. 5 is a section view similar to that of FIG. 4, but with the coil unit (30) (positioned between the mobile device (50) and the protective cover (52)) magnetically mounted to the base (20). The magnetic attraction force between the permanent magnets of the base's surrounding electrical contacts (24) pull the ferromagnetic surrounding electrical contacts (34) of the coil unit (30) toward it. The respective centrally located contacts (23, 33) of the base (20) and coil unit (30) will make contact first, due to the centrally located contact (23) of the base extending further than the surrounding contacts (24). Due to the magnetic forces between the base (20) and coil unit (30), the centrally positioned electrical contact (33) of the coil unit (30) up to the point where all the surrounding electrical contacts (24, 34) abut their respective counterparts.

With the coil unit (30) magnetically mounted to the base (20), the circuit between the base and the transmitter coil (36) is also completed. This enables the circuitry of the base (20) to cause an alternating current to flow in the transmitter coil (36) which, in turn, induces an electric current in the internal receiving coil (51) of the mobile device (50) through electromagnetic induction.

Figure 6:
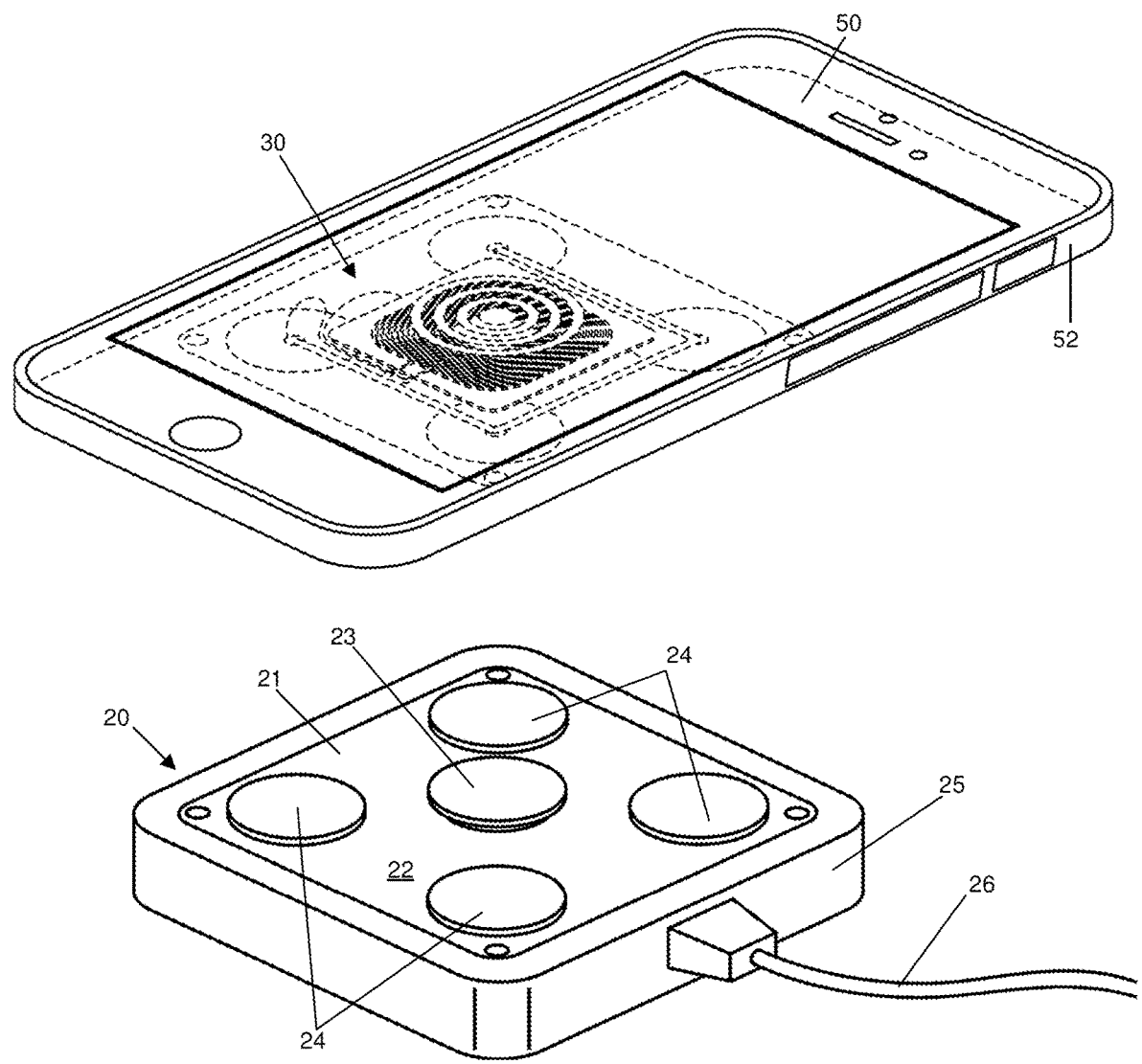
FIG. 6 is a three-dimensional view of the power transfer component (and mobile device) before mounting.
Figure 7:
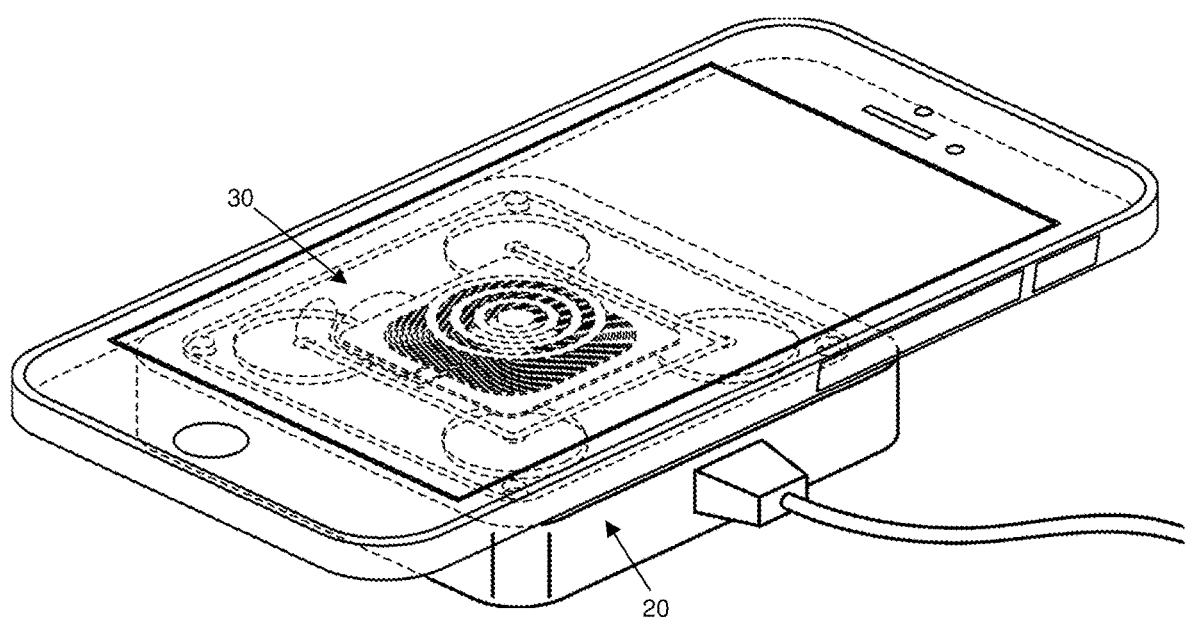
FIG. 7 is a three-dimensional view of the power transfer component (and mobile device) after mounting.

FIGS. 6 and 7 are additional three-dimensional views of the charger in an unmounted and mounted condition, respectively.

Some embodiments of the present disclosure, such as described above, therefore provides a wireless charger for a mobile device that enables induction wireless charging of a mobile device, having accessories (such a ruggedized cover) that would otherwise affect the efficacy of the induction wireless charger. In other embodiments of the present disclosure, a wireless charger for a mobile device may be provided that enables a mobile device to be wirelessly charged, in the sense that the charger is connected to the charging port of the mobile phone (via the power transfer component) by conveniently magnetically mounting the mobile device onto the base to complete the charging circuitry.

While the base (20) in the embodiment described above is suitable for desktop use, it is envisaged that in some embodiments the base may be housed in a specialised housing. For example, such a housing may be adapted for use in a vehicle. Such a housing may be installed in the vehicle, allowing the driver to conveniently mount their mobile device to the base. By doing so, the mobile device may be used for navigational purposes, for example, whilst charging the mobile device.

Various configurations of the electrical contacts of the base and coil unit are also envisaged. For example, the surrounding contact on each of the base and coil unit may be a concentric circle surrounding the centrally positioned contact, to enable omnidirectional placement.

The foregoing description has been presented for the purpose of illustration and is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention set forth in any accompanying claims.

Finally, throughout the specification and any accompanying claims, unless the context requires otherwise, the word 'comprise' or variations such as 'comprises' or 'comprising' will be understood to imply the inclusion of a stated integer or group of integers but not the exclusion of any other integer or group of integers.

The invention claimed is:

1. A charger for a mobile device comprising:
   a base that includes at least a subset of a circuitry of the charger and electrical contacts arranged on a mounting surface of the base to enable connection to terminals of a power transfer component external to the base in order to complete the circuitry of the charger; and
   a power transfer component having electrical contacts arranged on a mounting surface of the power transfer component to enable connection thereof to corresponding contacts on the base when the power transfer component is mounted to the base, wherein the power transfer component is configured to be positioned in proximity to a mobile device such that mounting the power transfer component to the base enables the base to transfer electrical power to the mobile device via the power transfer component, and wherein the mounting surfaces of the base and power transfer component include complementary magnetic mounts enabling the power transfer component to be magnetically mounted to the base, wherein the mounting surface of the base and the power transfer component each have a centrally positioned electrical contact for providing electrical connection between the base and a first terminal of the power transfer component, and a plurality of surrounding contacts arranged radially about the central contact for providing electrical connection between the base and a second terminal of the power transfer component, and wherein the mounting surface of the base and the power transfer component each have four surrounding contacts arranged radially about the central contact at substantially equal angular intervals.

2. The charger of claim 1, wherein at least one of the electrical contacts of the base or of the power transfer component at least partially consists of a permanent magnet to enable magnetic mounting with a corresponding contact on the other of the base and power transfer component.

3. The charger of claim 1, wherein the centrally positioned electrical contact on either of the base or the power transfer component is spring-loaded so as to extend further from the mounting surface than the surrounding contacts when the power transfer component is not mounted to the base, and the surrounding contacts on one or both of the base and the power transfer component may be permanent magnets enabling the surrounding contacts of the base to be magnetically mounted to the surrounding contacts of the power transfer component.

4. The charger of claim 1, wherein the power transfer component forms part of a protective cover for a mobile device, such that fitting a mobile device with the protective cover positions the power transfer component in proximity to the mobile device.

5. The charger of claim 4, wherein the power transfer component includes a transmitter coil configured to be positioned in proximity to a mobile device such that mounting the power transfer component to the base enables the base to transfer electrical power to the mobile device via the transmitter coil.

6. A protective cover for the mobile device including the power transfer component for the charger of claim 4.

* * * * *